Patented Sept. 26, 1944

2,358,808

UNITED STATES PATENT OFFICE 2,358,808

VALUABLE COMPOUNDS OF THE PREGNANE SERIES AND A METHOD OF PRODUCING THE SAME

Hans Herloff Inhoffen, Berlin-Wilmersdorf, Germany, assignor to Schering Corporation, Bloomfield, N. J., a corporation of New Jersey No Drawing. Application November 25, 1939, Serial No. 306,070. In Germany December 9, 1938

5 Claims. (Cl. 260—397.5)

This invention relates to valuable compounds of the pregnane series and a process for the manufacture thereof.

As is known, compounds of the androstane series which contain on the carbon atom 17 a side chain and a tertiary hydroxyl group and their stereo-isomers are produced either by condensing 17-ketones of this series with Grignard compounds or causing them to react with acetylenes in the presence of alkali metals. If such reaction products possess in 3-position a further hydroxyl group it is possible by oxidation of this hydroxyl group to produce compounds which are more strongly active than the corresponding hydroxy compounds.

In accordance with the present invention such compounds can also be produced by starting from saturated or unsaturated 3.17-diketones of the androstane series and their stereo-isomers, converting these into 3-keto derivatives stable to alkaline agents, in particular the 3-enol ethers and the 3-acetals, thereupon attaching acetylenes to the 17-keto group and subsequently if necessary restoring the 3-keto group.

The invention is of particular importance for the manufacture of the 17-ethinyl-$\Delta_{4.5}$-androstenol-17-one-3, which as is known in peroral administration possesses the effect of the corpus luteum hormone.

The selective manufacture of the 3-keto mono-derivatives of the androstane series stable to alkaline agents, and their stereo-isomers, from 3,17-diketones is accomplished by reactions which themselves are known (see for example the British Patent 494,484). Thus the acetalisation and/or enolisation of the starting ketones can take place in such a manner that these are heated with alcohols, suitably with exclusion of water, if desired in the presence of substances promoting the acetalisation or etherification. Instead of the alcohols also the corresponding alkyl halides can be employed. Particularly suitable has proved the reaction with ortho-formic acid ester in the presence of catalysts accelerating the reaction, for example mineral acid. It is also possible, however, to react the diketones with other acetals such as acetone diethyl acetal and the like in which case the process is advantageously carried out in the presence of catalysts accelerating the reacetalisation.

The adding on of acetylenes to the 17-keto group takes place suitably according to the process of specification Ser. Nos. 111,363 and 235,996, now Patents Nos. 2,251,931 and 2,265,976, granted August 12 and December 9, 1941, respectively. The condensation is carried out in the presence of alkali metals such as potassium, sodium, lithium and so on or of alkali metal compounds, such as alkali amides, alcohola'.es and the like. The process is suitably carried out in an indifferent organic solvent such as benzene, ether, dioxane and the like. The addition of liquid ammonia has in this case proved particularly useful. It is advantageous to proceed in such a manner that for example metallic potassium is dissolved in liquid ammonia, acetylene introduced into this solution to decolorisation and then a solution of the steroid ketone to be condensed, in an organic solvent, added.

The splitting off of the enol or acetal group is suitably effected by treatment with mineral acids advantageously in the presence of organic solvents for example alcohols.

The following examples illustrate the invention without, however, limiting the same to them.

Example 1

3 gs. of androstendione-3.17 are dissolved in 10 ccs. of benzene and treated with 1.8 gs. of ortho formic acid ethyl ester, 1.5 gs. of absolute alcohol and 11 drops of about 8% alcoholic hydrochloric acid. After 2 hours' heating to 75° the whole is cooled, rendered alkaline with alcoholic sodium hydroxide solution, poured into water and extracted with ether; the ethereal solution is washed several times with water, dried and evaporated. The residue is recrystallised from pyridine containing alcohol.

A solution of 1 g. of the androstendione-3-enol-ethyl-ether in a mixture of 50 ccs. of benzene and 50 ccs. of ether is allowed to flow into a solution of potassium acetylide in liquid ammonia (prepared by dissolving 2 gs. of potassium in 50 ccs. of liquid ammonia and passing in acetylene to decolorisation). After standing overnight, the reaction mixture, after the addition of more benzene, is poured into water, the benzene-ether layer washed several times with water and after drying evaporated in vacuum.

The residue is without further purification dissolved in 50 ccs. of alcohol and the mixture after the addition of 20 ccs. of 2N aqueous hydrochloric acid heated for about 20 minutes on the water bath. After concentration and cooling pregneninolone (ethinyl-testosterone) crystallises out and it is filtered with suction and recrystallised once from chloroform-alcohol. 800 mg. are obtained of pure pregneninolone of M. P. 264–266° C.

*Example 2*

To 50 ccs. of dry ether saturated with dry acetylene gas are added drop by drop within half an hour a solution of 1 g. of potassium in 15 ccs. of dry tertiary amyl alcohol and 1 g. of androstendione-3-enol-ethyl-ether in a mixture of 50 ccs. of ether and 50 ccs. of benzene and acetylene gas is passed with stirring through the reaction solution during a further 6 hours.

The benzene-ether layer is now washed several times with water and after clearing evaporated to dryness in vacuum.

The residue is immediately dissolved in 50 ccs. of alcohol and the mixture after the addition of 20 ccs. of 10% aqueous hydrochloric acid heated for about 15 minutes on the water bath. The pregneninolone which crystallises out after concentration in vacuum and cooling is filtered with suction and recrystallised once from chloroform-alcohol. 800 mg. are obtained of pure pregneninol-17-one-3 of M. P. 265–267° C.

Of course, various changes may be made in the details disclosed in the foregoing specification without departing from the invention and the claims annexed hereto.

What I claim is:

1. Process for the manufacture of ethinyl testosterone, which comprises reacting androstendione-3,17 with a member of the group consisting of etherifying and acetalizing agents capable of selectively introducing an enolic ether or an acetal group at the 3-position, treating the 3-derivative with acetylene in the presence of an alkali metal and of a member of the group consisting of ammonia and amines, and then heating the product with a mineral acid.

2. Process for the manufacture of saturated and unsaturated compounds of the pregnane series and their stereo-isomers, comprising treating a member of the group consisting of saturated and unsaturated 3,17-diketones of the androstane series with a compound acting to convert such diketone into the 3-enol ether, and thereupon adding an acetylene on to the 17-keto group with the aid of an alkaline agent.

3. Process for the manufacture of saturated and unsaturated compounds of the pregnane series and their stereo-isomers, comprising treating a member of the group consisting of saturated and unsaturated 3,17-diketones of the androstane series with an acetalizing agent acting to convert such diketone into the 3-acetal, and thereupon adding an acetylene on to the 17-keto group with the aid of an alkaline agent.

4. Process for the manufacture of saturated and unsaturated compounds of the pregnane series and their stereo-isomers, comprising treating a member of the group consisting of saturated and unsaturated 3,17-diketones of the androstane series with an ortho-formic acid ester to form the 3-keto derivative of the diketone, and thereupon adding an acetylene on to the 17-keto group with the aid of an alkaline agent.

5. Process for the manufacture of saturated and unsaturated compounds of the pregnane series and their stereo-isomers, comprising treating a member of the group consisting of saturated and unsaturated 3,17-diketones of the androstane series with acetone diethyl-acetal to form the 3-acetal derivative of the diketone, and thereupon adding an acetylene on to the 17-keto group with the aid of an alkaline agent.

HANS HERLOFF INHOFFEN